(12) United States Patent
Sim (10) Patent No.: US 11,445,070 B2
(45) Date of Patent: Sep. 13, 2022

(54) DETERMINING PRINT QUALITY BASED ON INFORMATION OBTAINED FROM RENDERED IMAGE

(71) Applicant: Hewlett-Packard Development Company, L.P., Spring, TX (US)

(72) Inventor: Gwangeun Sim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/283,320

(22) PCT Filed: Jul. 22, 2019

(86) PCT No.: PCT/US2019/042785
§ 371 (c)(1),
(2) Date: Apr. 7, 2021

(87) PCT Pub. No.: WO2020/153987
PCT Pub. Date: Jul. 30, 2020

(65) Prior Publication Data
US 2021/0392235 A1  Dec. 16, 2021

(30) Foreign Application Priority Data

Jan. 23, 2019 (KR) .................. 10-2019-0008918

(51) Int. Cl.
| H04N 1/00 | (2006.01) |
| G06K 15/02 | (2006.01) |
| H04N 1/60 | (2006.01) |

(52) U.S. Cl.
CPC ....... *H04N 1/00045* (2013.01); *G06K 15/027* (2013.01); *H04N 1/00015* (2013.01); *H04N 1/00031* (2013.01); *H04N 1/00034* (2013.01); *H04N 1/00037* (2013.01); *H04N 1/6036* (2013.01)

(58) Field of Classification Search
CPC .......... H04N 1/00045; H04N 1/00031; H04N 1/00034; H04N 1/00037; H04N 1/00015; H04N 2201/0094; G06K 15/027; G06F 3/1256
USPC ..................... 358/1.15, 504, 506
See application file for complete search history.

(56) References Cited

U.S. PATENT DOCUMENTS

| 2002/0141769 A1 | 10/2002 | Phillips |
| 2003/0076523 A1 | 4/2003 | Ito et al. |
| 2004/0085590 A1 | 5/2004 | Thiessen |

(Continued)

FOREIGN PATENT DOCUMENTS

| AU | 2013229059 A1 | 10/2014 |
| CN | 103324449 A | 9/2013 |
| KR | 10-2004-0011099 A | 2/2004 |

*Primary Examiner* — Kent Yip
(74) *Attorney, Agent, or Firm* — Jefferson IP Law, LLP (57) ABSTRACT

An example image forming apparatus includes an image forming apparatus, a processor, and a memory storing instructions executable by the processor. The processor of the image forming apparatus executes the instructions to render a print job, obtain information regarding a pattern for determining print quality from a rendered image of the print job, scan, through the image forming job unit, a document on which the rendered image is printed, and determine the print quality based on a scanned image of the document and the obtained information regarding the pattern.

20 Claims, 7 Drawing Sheets

(56) References Cited

U.S. PATENT DOCUMENTS

| | | |
|---|---|---|
| 2006/0110009 A1* | 5/2006 | Klassen ............ H04N 1/00015 |
| | | 382/112 |
| 2008/0137914 A1 | 6/2008 | Minhas |
| 2008/0187171 A1 | 8/2008 | Lim et al. |
| 2011/0149331 A1* | 6/2011 | Duggan ............... H04N 1/6047 |
| | | 358/1.14 |
| 2013/0194340 A1 | 8/2013 | Abbo et al. |

* cited by examiner

| DIAGNOSTIC ITEM | OBJECT FOR FINDING PATTERNS | DETERMINATION CRITERIA |
|---|---|---|
| OD | Solid Rectangle | CHECK WHETHER SOLID RECTANGLE OBJECT EXISTS, CHECK WHETHER RECTANGLE AREA IS BLACK |
| Line | Solid Line | CHECK WHETHER SOLID LINE OBJECT EXISTS CHECK WHETHER LINE COLOR IS BLACK |
| Background | White Region | |

| DIAGNOSTIC ITEM ID | LOCATION INFORMATION |
|---|---|
| Background<br>OD<br>Line | (200, 1000), (600, 1000)<br>(2000, 1000), (2600, 1000)<br>(100, 600), (1000, 604) |

| DIAGNOSTIC ITEM ID | DETERMINATION RESULT |
|---|---|
| Background<br>OD<br>Line | O<br>X<br>O |

DETERMINING PRINT QUALITY BASED ON INFORMATION OBTAINED FROM RENDERED IMAGE

BACKGROUND

When an image forming apparatus is used for a long period of time, print quality of the image forming apparatus may degrade due to various reasons. To determine and correct the print quality of the image forming apparatus, an expert such as a service technician considers a diagnostic item, operates the image forming apparatus such that it outputs a fixed pattern prepared in advance, and analyzes the output fixed pattern, thereby determining the print quality.

BRIEF DESCRIPTION OF DRAWINGS

Various examples will be described below by referring to the following figures.

DETAILED DESCRIPTION OF EXAMPLES

Hereinafter, one or more examples will be described with reference to the attached drawings. Like reference numerals in the drawings denote like elements, and thus their description will be omitted.

Figure 1:
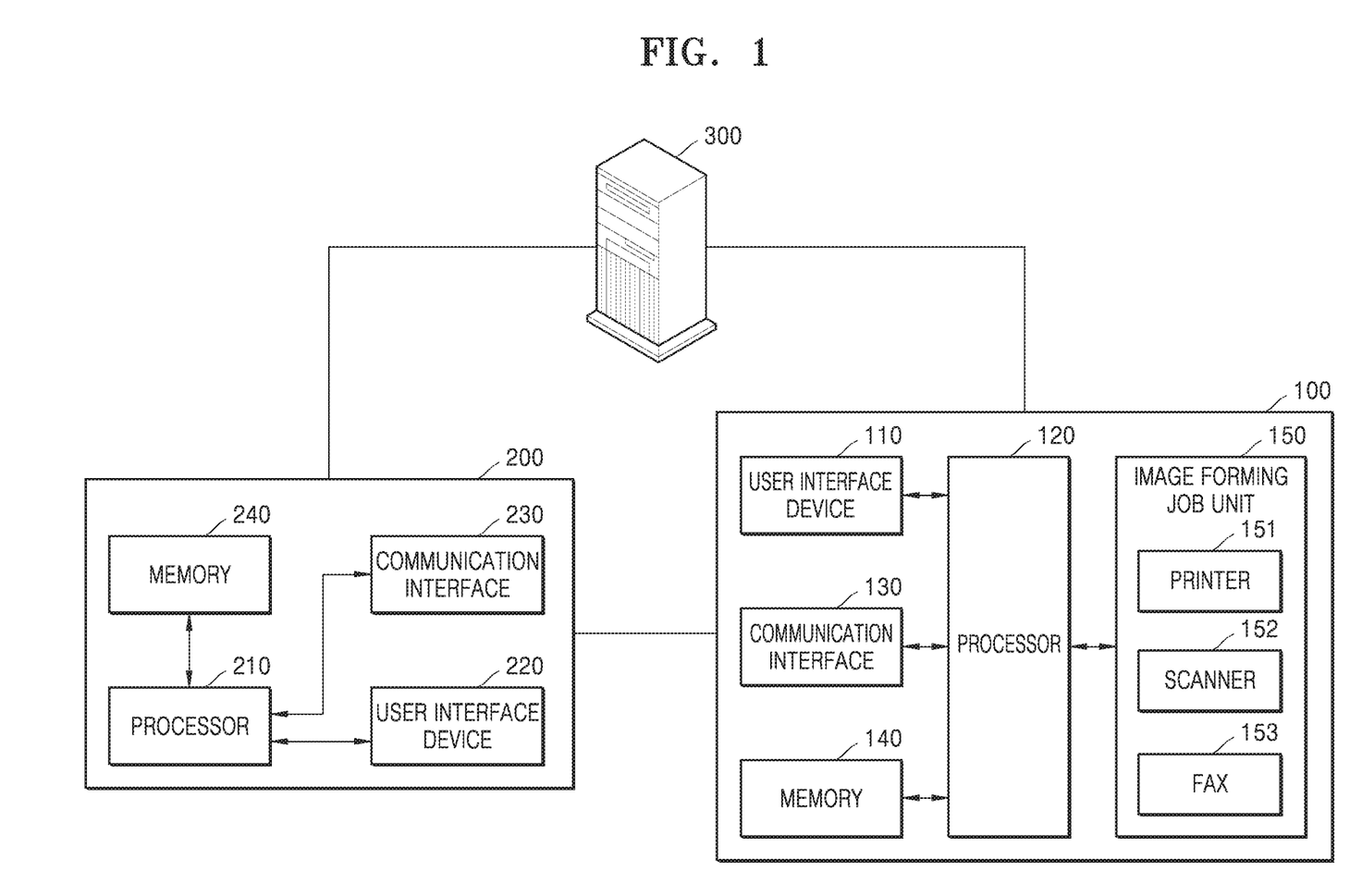
FIG. 1 is a diagram illustrating a printing environment including an image forming apparatus, a user device, and a server, according to an example.

FIG. 1 is a diagram illustrating a printing environment including an image forming apparatus, a user device, and a server, according to an example.

Referring to FIG. 1, an image forming apparatus 100 may perform an image forming job such as copying, printing, scanning, or faxing. The image forming apparatus 100 may form an image on a recording medium such as printing paper in various manners such as an electrophotographic method, an inkjet method, a heat transfer method, a thermosensitive method, and the like. A user device 200 may be an electronic device such as a smart phone, a smart watch, a laptop computer, a digital camera, and the like and may be implemented by any device capable of receiving/transmitting information by communicating with other devices. For example, the user device 200 may communicate with the image forming apparatus 100 and may remotely control the image forming apparatus 100. A server 300 is a device that provides a certain service and may be any of various types such as a service center server, a client management server, and the like according to a service provided by the server 300. When there is a request from the image forming apparatus 100 or the user device 200, the server 300 may support a certain service by providing a response to the request.

The image forming apparatus 100, the user device 200, and the server 300 may communicate with each other. A user may directly operate the image forming apparatus 100 or may indirectly operate the image forming apparatus 100 by using the user device 200. The server 300 may provide a certain service in response to a request from the image forming apparatus 100 or the user device 200.

As illustrated in FIG. 1, the image forming apparatus 100 may include a user interface device 110, a processor 120, a communication interface 130, a memory 140, and an image forming job unit 150. Although not shown, the image forming apparatus 100 may further include additional components such as a power supply to supply power to each component.

The user interface device 110 may include an input unit, which receives an input for performing an image forming job, etc. and an output unit which displays information such as a result of performing the image forming job, a result of determining the print quality of the image forming apparatus 100, a correction result, etc.

The processor 120 may control operations of the image forming apparatus 100 and may include at least one processor such as a central processing unit (CPU). The processor 120 may control other components included in the image forming apparatus 100 to perform an operation corresponding to a request received through the user interface device 110 or the communication interface 130. The processor 120 may include at least one specialized processor corresponding to each of various functions or may be a processor of an integrated type. The processor 120 may execute programs stored in the memory 140, may read data or files stored in the memory 140, or may store new files in the memory 140.

The communication interface 130 may perform wired/wireless communication with other devices or a network. To this end, the communication interface 130 may include a communication module (e.g., transceiver) for supporting at least one of various wired/wireless communication methods. The wireless communication may be, for example, Wireless Fidelity (Wi-Fi), Wi-Fi Direct, Bluetooth, Bluetooth Low Energy (BLE), Ultra Wide Band (UWB), Near Field Communication (NFC), or the like. The wired communication may be, for example, Ethernet, a universal serial bus (USB), a High Definition Multimedia Interface (HDMI), and the like.

The communication interface 130 may be connected to an external device outside the image forming apparatus 100 and may receive/transmit signals or data. The communication interface 130 may receive signals or data from the user device 200 or the server 300 or may transmit signals or data generated by the image forming apparatus 100 to the user device 200 or the server 300. The communication interface 130 may be directly or indirectly connected to the server 300 and may obtain the information provided by the server 300.

In the memory 140, various types of data, for example, files and programs such as applications, may be stored. The processor 120 may access and use the data stored in the memory 140, may store new data in the memory 140 or may execute the programs installed in the memory 140. Also, the processor 120 may install, in the memory 140, applications received from the outside through the communication interface 130.

The image forming job unit 150 may perform an image forming job such as copying, printing, scanning, or faxing. The image forming job unit 150 may include a printer 151, a scanner 152, and a fax 153, but according to necessity, the image forming job unit 150 may include only some of the components shown in FIG. 1 or may further include other components for performing other image forming jobs.

The printer 151 may produce an image on a recording medium by using various print methods such as an electrophotography method, an inkjet method, a thermal transfer method, a thermosensitive method, and the like. The scanner 152 may irradiate light onto a manuscript and receive reflected light, thereby reading an image recorded on the manuscript. Examples of an image sensor that reads an image from a manuscript may include, for example, a charge coupled device (CCD), a contact-type image sensor (CIS), and the like. The fax 153 may share a structure for scanning an image with the scanner 152, share a structure for printing a received file with the printer 151, and transmit a scanned file to a destination or receive a file from the outside.

The print quality of the image forming apparatus 100 may degrade as the image forming apparatus 100 is used. Hereinafter, according to examples described below, a determination and correction of the print quality for improving the print quality may be performed by using print materials according to a print job of a user, by operation of components of the image forming apparatus 100.

The processor 120 may execute instructions stored in the memory 140 and may perform rendering of a print job. The processor 120 may obtain information regarding a pattern for determining the print quality from a rendered image of the print job. The pattern for determining the print quality may be a diagnostic pattern used to diagnose the print quality. The processor 120 may collect or gather information regarding the diagnostic pattern from the rendered image of the print job. For example, the processor 120 may render the print job and may extract a type of an object, which is determined according to a diagnostic item, and color information of the object and location information indicating where the object is located in the rendered image, based on an image file, an object tag file, and a print material property file of the print job. The processor 120 may detect at least one pattern based on the extracted information and may obtain the location information for each diagnostic item with respect to the at least one detected pattern.

The processor 120 may scan a document on which the rendered image is printed through the image forming job unit 150 and may determine the print quality based on a scanned image of the document and the obtained information regarding the pattern. When the image forming apparatus 100 enters a standby state and satisfies a certain condition, the processor 120 may determine the print quality based on the scanned image of the document and the obtained information regarding the pattern. The processor 120 may determine the print quality for each diagnostic item, based on the location information that is obtained for each diagnostic item with regard to the scanned image. The processor 120 may determine the print quality according to a predetermined cycle. The predetermined cycle may be determined in advance or may be set by the user. Processes of obtaining an image file, an object tag file, and a print material property file of a print job, detecting patterns, obtaining location information for each diagnostic item, scanning a document on which the rendered image is printed, and the like may be performed according to a predetermined cycle of determining the print quality.

The processor 120 may transmit a determination result of the print quality to the server 300 through the communication interface 130 and may receive a correction measure corresponding to the determination result of the print quality from the server 300 in response to the transmission of the determination result of the print quality. The processor 120 may perform the correction according to the received correction measure. Also, the processor 120 may check the correction measure corresponding to the determination result of the print quality in the image forming apparatus 100 and may perform the correction according to the checked correction measure.

The user device 200 may include a processor 210, a user interface device 220, a communication interface 230, and a memory 240.

The processor 210 may control operations of the user device 200 and may include at least one processing unit such as a CPU. The processor 210 may control other components included in the user device 200 to perform operations corresponding to user inputs received through the user interface device 220. The processor 210 may include at least one processing unit specialized for each of various functions or may be a processor of an integrated type. The processor 210 may execute programs stored in the memory 240, read data or files stored in the memory 240, or store new files in the memory 240.

The user interface device 220 may include an input unit to obtain a user input and an output unit to provide information to the user. For example, the input unit may be an operation panel capable of receiving operations of the user, a microphone capable of obtaining the voice of the user, and the like. The output unit may be a display panel displaying a screen, a speaker, and the like.

The user device 200 may be connected to an external device such as the image forming apparatus 100 or the server 300 through the communication interface 230. To this end, the communication interface 230 may support at least one of Wi-Fi, Wi-Fi Direct, Bluetooth, BLE, UWB, NFC, 3rd generation (3G), 4G, 5G, and the like.

The memory 240 may store therein instructions executable by the processor 210. In the memory 240, various types of data such as files and programs such as applications may be installed and stored.

The server 300 may include a memory, a processor, and a communication interface. The server 300 may store information regarding a service provided by the server 300 or information received from an external device. The server 300 may include at least one processing unit. The server 300 may include a corresponding communication module to communicate with the communication interface 130 of the image forming apparatus 100 or the communication interface 230 of the user device 200. For example, the server 300 may receive a determination result of print quality from the image forming apparatus 100 and may transmit a correction measure corresponding to the determination result of the print quality to the image forming apparatus 100 by retrieving the correction measure corresponding to the determination result of the print quality or requesting the correction measure from a source (e.g., an expert).

Hereinafter, referring to FIGS. 2 to 9, examples of processes in which the image forming apparatus 100 determines and corrects print quality by using print materials according to a print job of a user will be described.

Figure 2:
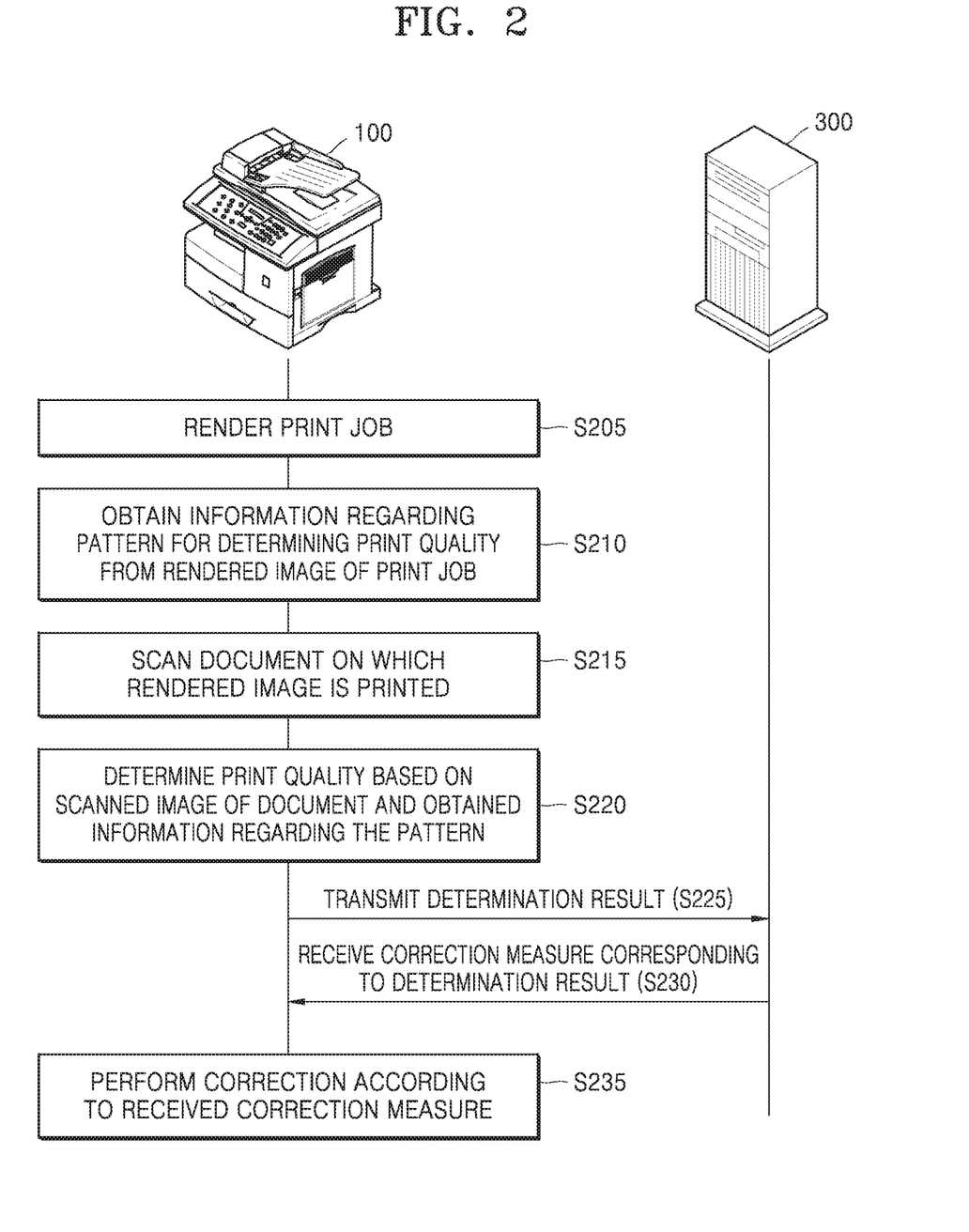
FIG. 2 is a diagram of a process in which an image forming apparatus determines and corrects print quality, according to an example.

FIG. 2 is a diagram of a process in which an image forming apparatus determines and corrects print quality, according to an example.

Referring to FIG. 2, the image forming apparatus 100 may render the print job in operation S205. The print job may correspond to general print material (e.g., print image) that the user desires to output.

In operation S210, the image forming apparatus 100 may obtain information regarding a pattern for determining print quality, from a rendered image of the print job.

Figure 3:
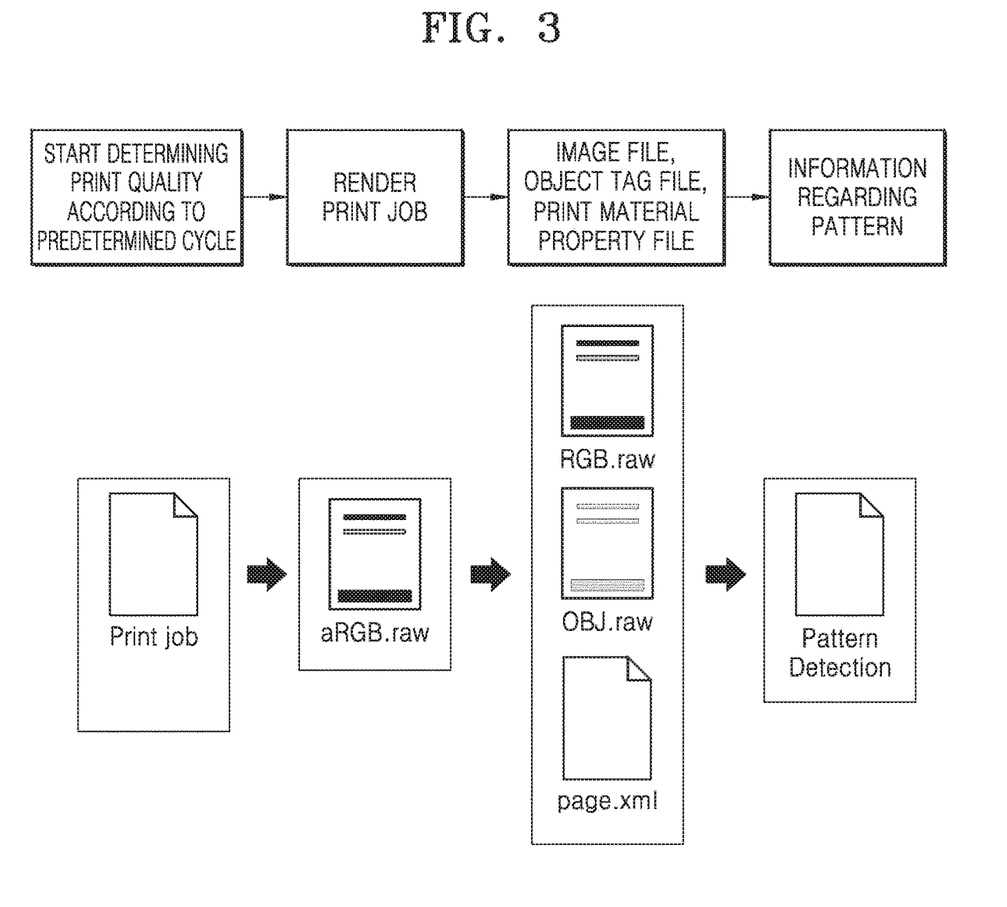
FIG. 3 is a diagram of a process of obtaining, from a rendered image of a print job, information regarding a pattern for determining print quality, according to an example.

FIG. 3 is a diagram of a process of obtaining, from a rendered image of a print job, information regarding a pattern for determining print quality, according to an example.

Referring to FIG. 3, the image forming apparatus 100 may determine print quality according to a predetermined cycle. When a request for a print job is made, the image forming apparatus 100 may render the print job. As the print job is rendered, the image forming apparatus 100 may generate an image file, an object tag file, and a print material property file of the print job. The image forming apparatus 100 may extract a type of an object, which is determined according to a diagnostic item, and color information of the object and location information indicating where the object is located in the rendered image, based on the generated files. The image forming apparatus 100 may extract information used to extract the pattern for determining the print quality from the print material according to the print job of the user.

The image forming apparatus 100 may detect at least one pattern based on the extracted information. The image forming apparatus 100 may obtain the location information for each diagnostic item with regard to the detected pattern and may obtain the information regarding the pattern.

Figure 4:
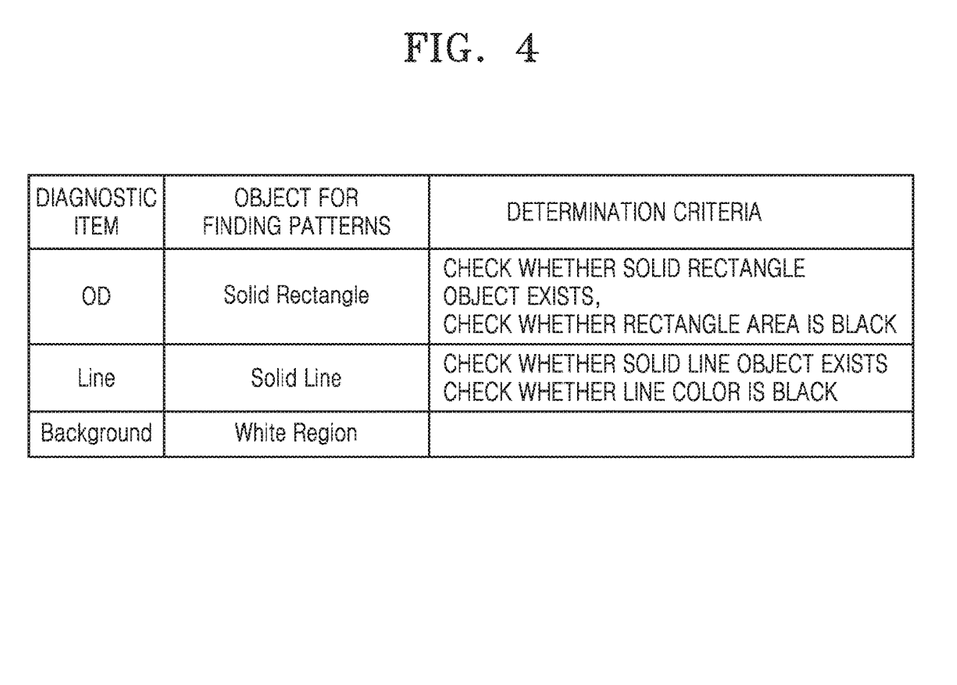
FIG. 4 is a diagram of determination criteria for detecting a pattern, according to an example.
Figure 5:
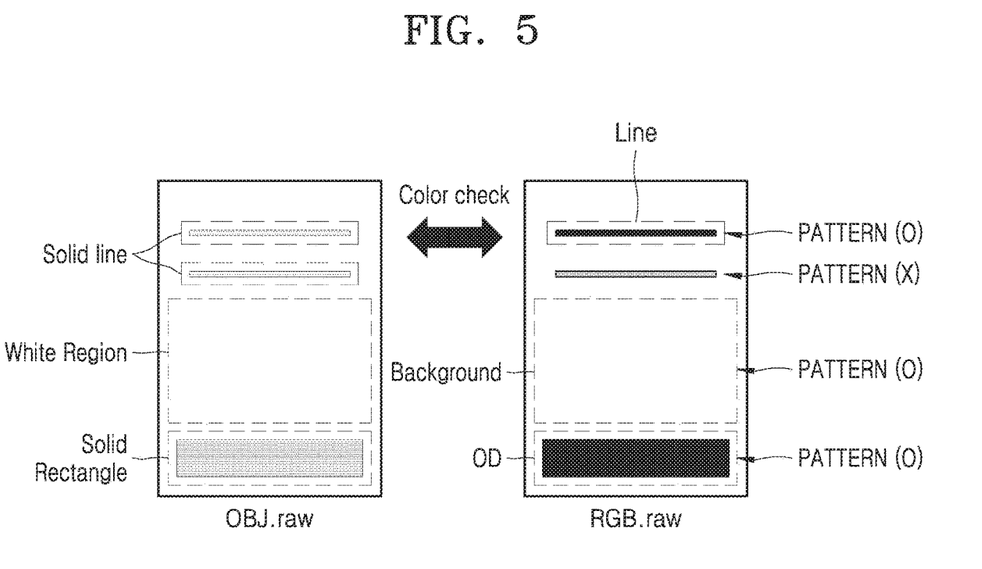
FIG. 5 is a diagram of a process of detecting a pattern, according to an example.

FIG. 4 is a diagram of determination criteria for detecting a pattern, according to an example. FIG. 5 is a diagram of a process of detecting a pattern, according to an example.

Referring to FIGS. 4 and 5, the image forming apparatus 100 may map a type of an object for detecting a pattern and determination criteria used to determine whether the object corresponds to the pattern for each diagnostic item, and may store the mapped determination criteria for each type of the object in the memory 140. The mapped information may be used to detect the pattern for determining print quality from print material output according to a print job of the user.

FIG. 4 shows examples of types of objects for detecting a pattern and determination criteria used to determine whether a detected object corresponds to the pattern for each diagnostic item.

For example, to determine an 'optical diagnostic' (OD) diagnostic item, an object of a 'solid rectangle' type has to be present and a color thereof has to be black. Thus, an object satisfying the above conditions may be detected as a pattern for determining the 'OD' diagnostic item.

As another example, to determine a 'Line' diagnostic item, an object of a 'solid line' type has to be present and a color thereof has to be black. Thus, an object satisfying the above conditions may be detected as a pattern for determining the 'Line' diagnostic item.

As another example, an object of a 'white region' type has to be present to determine a 'background' diagnostic item. Thus, an object satisfying the above condition may be detected as a pattern for determining the 'background' diagnostic item.

FIG. 5 shows a process of detecting a pattern for determining print quality according to an example.

The image forming apparatus 100 may determine whether there is an object corresponding to each diagnostic item based on an object tag file according to the rendering of the print job. When the object corresponding to each diagnostic item exists, the image forming apparatus 100 may check a color of the object in an image file and may determine whether the object corresponds to the pattern for determining the print quality.

For example, the image forming apparatus 100 may determine whether an object corresponding to a 'solid line' exists in the object tag file in order to determine the 'line' diagnostic item, may retrieve a location of the object corresponding to the 'solid line' from an RGB image file, and may check whether a color of the corresponding location is black, thereby detecting a pattern for determining the 'line' diagnostic item.

In the example of FIGS. 4 and 5, it is identified that there are two objects corresponding to 'solid lines' in the object tag file, and a color of each object is identified in the RGB image file. It is identified that an object that has a black color is detected as a pattern and an object that has another color is not detected as a pattern. Also, it is identified that an object corresponding to a 'solid rectangle' exists in the object tag file and the object has a 'black' color in the RGB image file. Thus, the object is detected as a pattern. In addition, since it is identified that an object corresponding to a 'white region' exists in the object tag file, the object is detected as a pattern.

The image forming apparatus 100 may obtain location information for each diagnostic item with regard to at least one detected pattern and may obtain information regarding the pattern. The image forming apparatus 100 may store, in the memory 140, the information regarding the pattern that includes the location information for each diagnostic item, so that the print quality may then be determined based on the pattern detected during the process of determining the print quality.

Referring back to FIG. 2, in operation S215, the image forming apparatus 100 may scan the document on which the rendered image is printed. The image forming apparatus 100 may scan the document and obtain a scanned image of the document before outputting the document and may store the scanned image in the memory 140.

In operation S220, the image forming apparatus 100 may determine the print quality based on the scanned image and the obtained information regarding the pattern. When the image forming apparatus 100 enters a standby state and satisfies a certain condition, the image forming apparatus 100 may determine the print quality based on the scanned image and the obtained information regarding the pattern. For example, when no request for a print job is made for at least 30 minutes or when a certain period of time that is set by the user passes after the print job of the user finishes and the image forming apparatus 100 enters the standby state, the image forming apparatus 100 may determine the print quality based on the scanned image that is stored in the memory 140 and location information that is obtained for each diagnostic item. The image forming apparatus 100 may determine the print quality for each diagnostic item, based on location information obtained for each diagnostic item with regard to the scanned image.

Figure 6:
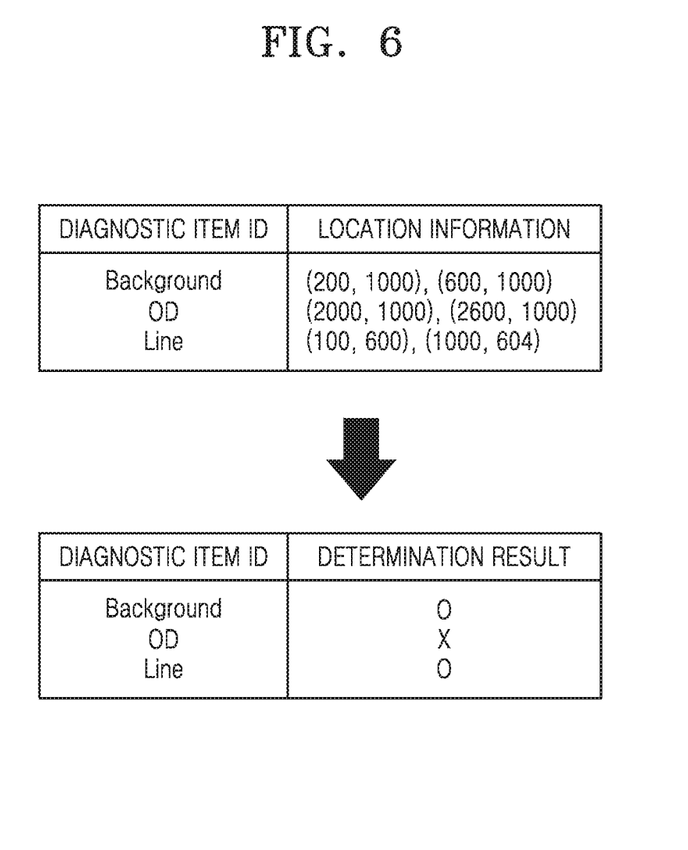
FIG. 6 is a diagram of a result of determining print quality by obtaining location information of a pattern for each diagnostic item, according to an example.

FIG. 6 is a diagram of a result of determining print quality by obtaining location information of a pattern for each diagnostic item, according to an example.

Referring to FIG. 6, the image forming apparatus 100 may map and store location information of a pattern for each diagnostic item. When the image forming apparatus 100 determines the print quality, the image forming apparatus 100 may analyze a portion of a scanned image of a document which corresponds to the location information of the pattern for each diagnostic item and may determine the print quality for each diagnostic item. As shown in FIG. 6, the image forming apparatus 100 may store a determination result for each diagnostic item.

Referring back to FIG. 2, in operation S225, the image forming apparatus 100 may transmit the determination result of the print quality to the server 300.

In operation S230, the image forming apparatus 100 may receive a correction measure corresponding to the determination result of the print quality from the server 300, in response to the transmission of the determination result of the print quality.

In operation S235, the image forming apparatus 100 may perform the correction according to the received correction measure.

When the correction measure corresponding to the determination result of the print quality is included as a database in the image forming apparatus 100, the image forming apparatus 100 may check the correction measure corresponding to the determination result of the print quality in the image forming apparatus 100 and may perform the correction according to the checked correction measure.

Figure 7:
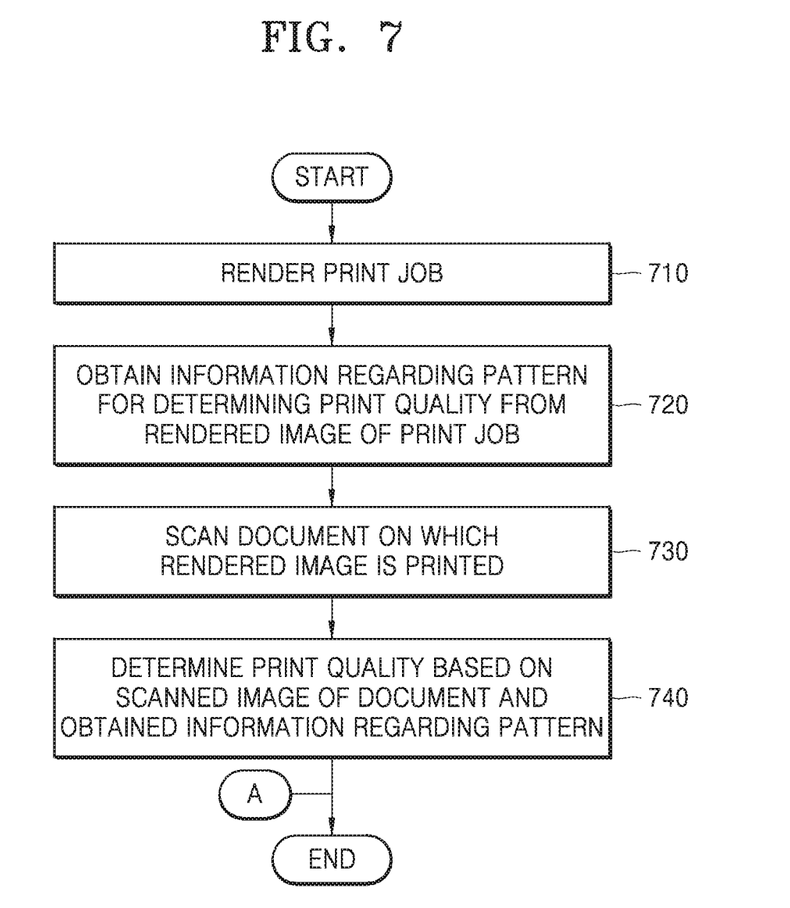
FIG. 7 is a flowchart of a method of determining print quality, according to an example.

FIG. 7 is a flowchart of a method of determining print quality, according to an example.

Referring to FIG. 7, the image forming apparatus 100 may render a print job in operation 710. The print job may be relevant to general print material that the user desires to output and need not be relevant to print material that is especially created to determine the print quality.

In operation 720, the image forming apparatus 100 may obtain information regarding a pattern for determining print quality from the rendered image of the print job.

As the print job is rendered, the image forming apparatus 100 may generate an image file, an object tag file, and a print material property file of the print job. The image forming apparatus 100 may extract a type of an object, which is determined according to a diagnostic item, and color information of the object and location information indicating where the object is located in the rendered image, based on the generated files.

The image forming apparatus 100 may detect at least one pattern based on the extracted information. The image forming apparatus 100 may obtain location information for each diagnostic item with regard to the at least one detected pattern. The image forming apparatus 100 may store, in the memory 140, the location information for each diagnostic item so that the print quality may be determined based on the pattern detected during the process of determining the print quality.

In operation 730, the image forming apparatus 100 may scan the document on which the rendered image is printed. The image forming apparatus 100 may scan the document and obtain the scanned image of the document before outputting the document and may store the scanned image in the memory 140.

In operation 740, the image forming apparatus 100 may determine the print quality based on the scanned image and the obtained information regarding the pattern. When the image forming apparatus 100 enters a standby state and satisfies a certain condition, the image forming apparatus 100 may determine the print quality based on the scanned image and the obtained information regarding the pattern. For example, when no request for a print job is made for at least 30 minutes or when a certain period of time that is set by the user passes after the print job of the user finishes and the image forming apparatus 100 enters the standby state, the image forming apparatus 100 may determine the print quality based on the scanned image that is stored in the memory 140 and the location information that is obtained for each diagnostic item. The image forming apparatus 100 may determine the print quality for each diagnostic item, based on the location information obtained for each diagnostic item with regard to the scanned image.

The method of determining the print quality may be implemented according to a predetermined cycle set by the user and with regard to an arbitrary print material.

Figure 8:
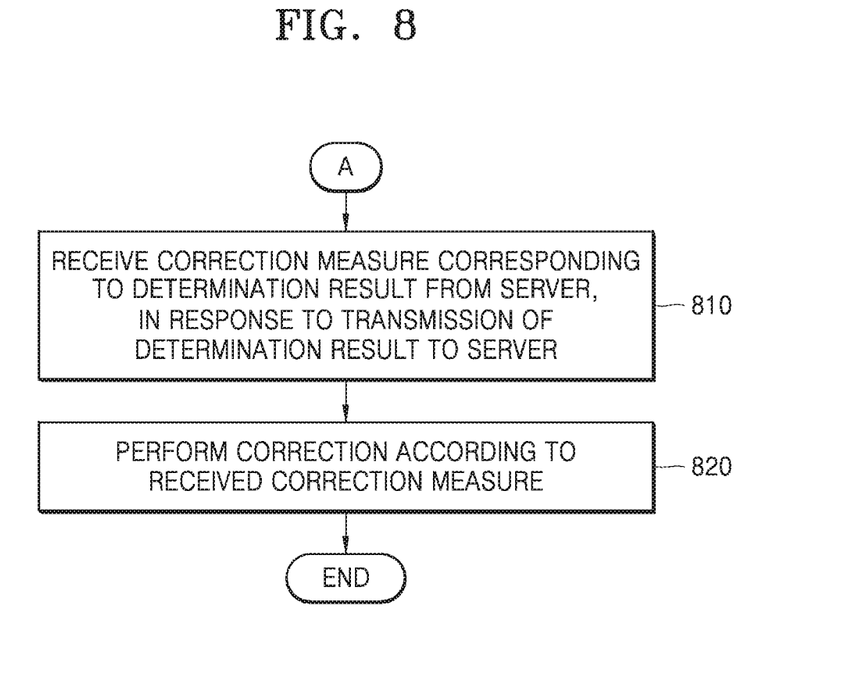
FIG. 8 is a flowchart of a method of determining and correcting print quality, according to an example.

FIG. 8 is a flowchart of a method of determining and correcting print quality, according to an example.

Referring to FIG. 8, the image forming apparatus 100 may receive a correction measure corresponding to a determination result of print quality from the server 300 in response to the transmission of the determination result of the print quality to the server 300 in operation 810. When solutions corresponding to the correction measure of the print quality are not provided by the image forming apparatus 100 or when it is impossible to obtain such solutions from the image forming apparatus 100, the image forming apparatus 100 may transmit the determination result of the print quality to the server 300 and may receive the correction measure corresponding to the determination result of the print quality from the server 300.

In operation 820, the image forming apparatus 100 may perform the correction according to the received correction measure.

Figure 9:
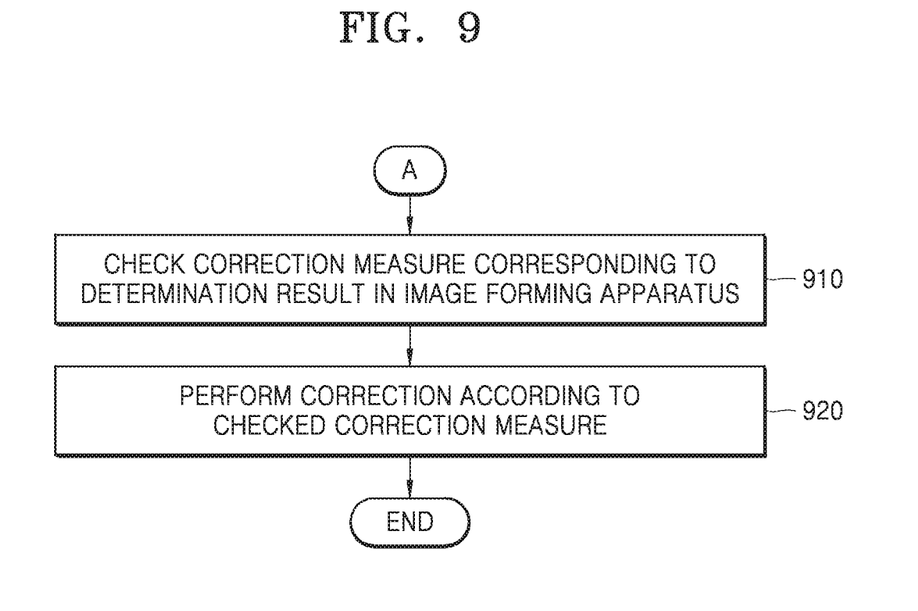
FIG. 9 is a flowchart of a method of determining and correcting print quality, according to an example.

FIG. 9 is a flowchart of a method of determining and correcting print quality, according to an example.

Referring to FIG. 9, the image forming apparatus 100 may check a correction measure corresponding to a determination result of the print quality in the image forming apparatus 100 in operation 910. When a solution corresponding to the correction measure of the print quality is provided by the image forming apparatus 100, the image forming apparatus 100 may check the correction measure corresponding to the determination result of the print quality that is stored in the image forming apparatus 100.

In operation 920, the image forming apparatus 100 may perform the correction according to the checked correction measure.

According to the aforementioned methods regarding the determination and the correction of the print quality, since the print quality may be determined and corrected by using the print materials that are output according to the print job of the user according to a predetermined cycle set by the user, knowledge and experiences of experts such as service technicians may not be required, and the print quality may be determined and corrected at a point in time that the user wants and without unnecessary costs.

The one or more examples may be embodied as a non-transitory computer-readable recording medium storing instructions or data executable by a computer or a processor, may be written as programs executable by a computer, and may be implemented in a general-use digital computer that executes the programs using a computer-readable recording medium. Examples of the non-transitory computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, photomagnetic data storage devices, optical data storage devices, hard disks, solid state disks (SSDs), and any device capable of storing instructions or software, relevant data, data files, and data structures, and providing processors or computers with instructions or software, relevant data, data files, and data structures so that the processors or computers can execute the instructions.

What is claimed is:

1. An image forming apparatus comprising:
an image forming job unit;
a processor; and
a memory to store instructions executable by the processor and a pattern of a diagnostic item,
wherein the processor is to execute the instructions to:
 render a print job;
 identify whether a rendered image of the print job includes an object corresponding to the pattern of the diagnostic item;
 based on the rendered image of the print job including the object corresponding to the pattern of the diagnostic item, obtain color information of the object in the rendered image based on a location of the object in the rendered image;
 based on the color information corresponding to the pattern of the diagnostic item, identify that the object includes a pattern for determining print quality;
 scan, through the image forming job unit, a document on which the rendered image is printed; and
 determine the print quality based on a scanned image of the document and the pattern for determining the print quality.

2. The image forming apparatus of claim 1, wherein the processor executes the instructions to:
 extract a type of the object and the color information of the object in the rendered image;
 and
 determine whether the object corresponds to the pattern for determining the print quality based on the extracted type and color information of the object.

3. The image forming apparatus of claim 1, wherein the processor executes the instructions to:
 extract a type of the object, the color information of the object, and location information indicating the location of the object in the rendered image, based on an image file, an object tag file, and a print material property file of the print job, wherein the type of the object is determined according to the diagnostic item;
 detect the pattern for determining the print quality based on the extracted information; and
 obtain the location information for the diagnostic item with regard to the detected pattern for determining the print quality.

4. The image forming apparatus of claim 3, wherein the processor executes the instructions to determine the print quality for the diagnostic item, based on the location information obtained for the diagnostic item with regard to the scanned image.

5. The image forming apparatus of claim 1, wherein the processor executes the instructions to, based on the image forming apparatus entering a standby state and satisfying a certain condition, determine the print quality based on the scanned image of the document and the obtained information regarding the pattern.

6. The image forming apparatus of claim 1, wherein the processor executes the instructions to determine the print quality according to a predetermined cycle.

7. The image forming apparatus of claim 1, further comprising a communication interface,
wherein the processor executes the instructions to receive, from a server, a correction measure corresponding to a determination result of the print quality, in response to transmission of the determination result to the server through the communication interface, and to perform correction according to the received correction measure.

8. The image forming apparatus of claim 1, wherein the processor executes the instructions to check a correction measure corresponding to a determination result in the image forming apparatus and perform correction according to the checked correction measure.

9. A method of determining print quality, the method comprising:
 rendering a print job;
 identifying whether a rendered image of the print job includes an object corresponding to a pattern of a diagnostic item;
 based on the rendered image of the print job including the object corresponding to the pattern of the diagnostic item, obtaining color information of the object in the rendered image based on a location of the object in the rendered image;
 based on the color information corresponding to the pattern of the diagnostic item, identifying that the object includes a pattern for determining print quality;
 scanning a document on which the rendered image is printed; and
 determining the print quality based on a scanned image of the document and the pattern for determining the print quality.

10. The method of claim 9, wherein the obtaining of the information comprises:
 extracting a type of the object, the color information of the object, and location information indicating the location of the object in the rendered image, based on an image file, an object tag file, and a print material property file of the print job, wherein the type of the object is determined according to the diagnostic item;
 detecting the pattern for determining the print quality based on the extracted information; and
 obtaining the location information for the diagnostic item with regard to the detected pattern for determining the print quality.

11. The method of claim 10, wherein the determining of the print quality comprises determining the print quality for the diagnostic item, based on the location information obtained for the diagnostic item with regard to the scanned image.

12. The method of claim 9, wherein the determining of the print quality comprises, based on the image forming apparatus entering a standby state and satisfying a certain condition, determining the print quality based on the scanned image of the document and the obtained information regarding the pattern.

13. The method of claim 9, wherein the determining of the print quality is performed according to a predetermined cycle.

14. A non-transitory computer-readable recording medium storing instructions executable by a processor, the computer-readable recording medium comprising:
 instructions to render a print job;
 instructions to identify whether a rendered image of the print job includes an object corresponding to a pattern of a diagnostic item;
 instructions to, based on the rendered image of the print job including the object corresponding to the pattern of the diagnostic item, obtain color information of the object in the rendered image based on a location of the object in the rendered image;

instructions to, based on the color information corresponding to the pattern of the diagnostic item, identify that the object includes a pattern for determining print quality;

instructions to scan a document on which the rendered image is printed; and instructions to determine the print quality based on a scanned image of the pattern for determining the print quality.

15. The non-transitory computer-readable recording medium of claim 14, comprising:

instructions to extract a type of the object and the color information of the object in the rendered image; and instructions to determine whether the object corresponds to the pattern for determining the print quality based on the extracted type and color information of the object.

16. The non-transitory computer-readable recording medium of claim 14, comprising:

instructions to extract a type of the object, the color information of the object, and location information indicating the location of the object in the rendered image, based on an image file, an object tag file, and a print material property file of the print job, wherein the type of the object is determined according to the diagnostic item;

instructions to detect the pattern for determining the print quality based on the extracted information;

instructions to obtain the location information for the diagnostic item with regard to the detected pattern for determining the print quality; and instructions to determine the print quality for the diagnostic item, based on the location information obtained for the diagnostic item with regard to the scanned image.

17. The non-transitory computer-readable recording medium of claim 14, comprising instructions to, based on the image forming apparatus entering a standby state and satisfying a certain condition, determine the print quality based on the scanned image of the document and the obtained information regarding the pattern.

18. The non-transitory computer-readable recording medium of claim 14, comprising instructions to determine the print quality according to a predetermined cycle.

19. The non-transitory computer-readable recording medium of claim 14, comprising instructions to receive, from a server, a correction measure corresponding to a determination result of the print quality, in response to transmission of the determination result to the server through a communication interface, and to perform correction according to the received correction measure.

20. The non-transitory computer-readable recording medium of claim 14, comprising instructions to check a correction measure corresponding to a determination result in the image forming apparatus and perform correction according to the checked correction measure.

* * * * *